United States Patent [19]

Anderson et al.

[11] 4,247,893
[45] Jan. 27, 1981

[54] MEMORY INTERFACE DEVICE WITH PROCESSING CAPABILITY

[75] Inventors: Jack L. Anderson, Scottsdale; Thomas J. Balph, Tempe, both of Ariz.

[73] Assignee: Motorola, Inc., Schaumburg, Ill.

[21] Appl. No.: 756,170

[22] Filed: Jan. 3, 1977

[51] Int. Cl.³ .................... G06F 9/32; G06F 13/00
[52] U.S. Cl. .................................................. 364/200
[58] Field of Search ... 364/200 MS File, 900 MS File

[56] References Cited

U.S. PATENT DOCUMENTS

| 3,573,741 | 4/1971 | Gavril | 364/200 |
|---|---|---|---|
| 3,587,058 | 6/1971 | Butler et al. | 364/200 |
| 3,713,107 | 1/1973 | Barsamian | 364/200 |
| 3,723,976 | 3/1973 | Alvarez et al. | 364/200 |
| 3,793,631 | 2/1974 | Silverstein et al. | 364/200 |
| 3,833,889 | 9/1974 | Cray | 364/200 |
| 3,916,383 | 10/1975 | Malcolm | 364/200 |
| 3,943,494 | 3/1976 | Holmes, Jr. et al. | 364/200 |
| 3,967,246 | 6/1976 | House | 364/200 |
| 3,982,231 | 9/1976 | Bernstein et al. | 364/200 |
| 4,030,076 | 6/1977 | Blum et al. | 364/200 |
| 4,071,890 | 1/1978 | Pandeya | 364/200 |
| 4,077,060 | 2/1978 | Bodner et al. | 364/200 |
| 4,079,455 | 3/1978 | Ozga | 364/200 |
| 4,086,629 | 4/1978 | Desyllas et al. | 364/200 |
| 4,095,265 | 6/1978 | Vrba | 364/200 |
| 4,109,311 | 8/1978 | Blum et al. | 364/200 |
| 4,115,850 | 9/1978 | Houston et al. | 364/200 |

*Primary Examiner*—Melvin B. Chapnick
*Attorney, Agent, or Firm*—Vincent B. Ingrassia; Anthony J. Sarli, Jr.

[57] ABSTRACT

An interface device to provide a data and address path between a data processor, a memory and peripheral devices. The interface device includes an internal arithmetic and logic unit to provide a means for generating and/or modifying addresses for the memory or peripheral devices. The device further includes a plurality of registers for temporarily storing data or addresses as well as information associated with addressing functions, for example, program counter, index register, stack pointer and page addresses. The interface device may be used singly or in combination with like devices as in a slice processing system.

4 Claims, 5 Drawing Figures

MEMORY INTERFACE DEVICE WITH PROCESSING CAPABILITY

BACKGROUND OF THE INVENTION

1. Field of the Invention

This invention relates to memory interface devices and, more particularly, to devices which provide a data and address path between an arithmetic/logic unit and a memory and which provide mechanisms for generating or modifying memory addresses.

2. Description of the Prior Art

In a high-performance processor system, it is desirable to free the high-speed internal data processor from slower memory and peripheral system sections. An interface circuit is needed that provides storage for equipment address and data transfer. Also, for maximum speed, the interface circuit must operate in parallel with other parts of the system and be able to both route data and do memory address operations.

In the past, the arithmetic/logic unit (ALU) of the data processing system was required to perform arithmetic and logic functions in order to generate addresses for accessing the memory unit of the system. During the periods of time when the ALU was performing these system overhead tasks it was unavailable for its primary function of operating on data. In generating memory addresses, it is frequently necessary to perform arithmetic operations for, for example, indexed or base register addressing where an incremental or offset value must be added to an address. In a high-speed system, the use of the main system data processor to perform these functions is wasteful of valuable computing time.

It is an object of the present invention, therefore, to provide an interface unit between the system ALU and the memory unit capable of performing limited arithmetic and logic functions to relieve the system ALU of the burden of generating memory addresses and performing memory or peripheral overhead operations.

It is a further object of the invention to provide a device which is capable of performing limited arithmetic, logical and data path selection operations such that it may be utilized as a system ALU in limited systems.

It is a still further object of the present invention to provide a flexible register structure to handle system address register requirements such as index storage, program counter storage and the like.

SUMMARY OF THE INVENTION

These and other objects of the invention are accomplished by providing an ALU-memory interface device having arithmetic and logical capabilities together with data and address path selection and storage means to relieve the system ALU of burdensome and time-consuming memory addressing and overhead functions.

BRIEF DESCRIPTION OF THE DRAWINGS

The features of the instant invention will become more apparent from the following detailed description of a preferred embodiment thereof when taken in conjunction with the accompanying drawings, in which.

DETAILED DESCRIPTION OF THE PREFERRED EMBODIMENT

Figure 1:
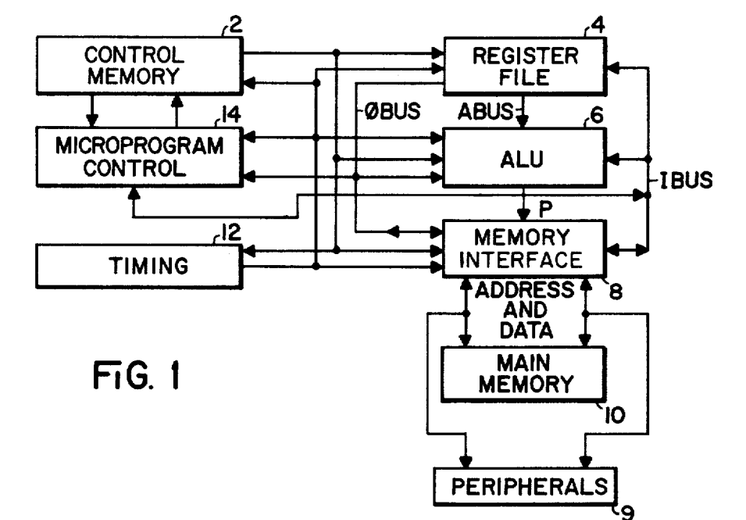
FIG. 1 is a block diagram of a microprogrammable system utilizing the memory interface device of the instant invention.

In a microprogrammed processor, such as is shown in FIG. 1, the microprogram instructions may be contained in control memory 2. Depending upon system requirements and size, the control memory 2 can vary from a few hundred words to several thousand words of microinstructions. The size and organization of the microinstructions is determined by the system designer based upon the number of functions, buses, registers, and the like to be controlled in the specific application toward which the processor system is directed. The control memory 2 may be constructed with programmable read-only memories such as part number MCM10149 or by random access memory chips such as part number MCM10144 or MCM10146, all of which parts are available from Motorola, Inc.

In a microprogrammed processor the information for executing a machine function (a macroinstruction) is contained within the control memory 2. Certain control memory outputs go to a register file 4, the arithmetic and logic unit 6 and a memory interface 8. The control memory outputs control the specific function performed by each of the elements of the system. The number of control memory steps or microinstructions required to execute a macroinstruction which forms a part of user program and is typically contained within the main memory unit 10, is determined by the complexity of the instruction. The general principles of microprogramming are well known, and it is well known that macroinstructions of varying complexity may be executed by from one or two microinstructions, for a simple register to register addition function, to a large number of microinstructions, sequentially executed, which may be required for a complex operation such as a multiply or floating point arithmetic calculation.

A suitable arithmetic and logic unit for use in this system may be part number MC10800, which part is available from Motorola, Inc.

An important element of the microprogrammable system is the microprogram control logic 14. This device, which in a preferred embodiment may be a monolithic semiconductor chip, holds the presently used control memory word address and controls the machine sequencing to execute processor operations. In a preferred embodiment, the microprogram control device is 4 bits wide and may be utilized in parallel with similar devices to form a control memory address capability of any width desired based upon the control memory size requirements for the specific application of the machine. Additionally, while the ALU earlier referenced may also be 4 bits wide, several ALU chips may be utilized in parallel to perform arithmetic and logical operations on data words of greater length than 4 bits. A suitable microprogram control logic device is disclosed in copending patent application Ser. No. 009,024, which is a continuation of patent application Ser. No. 756,153, now abandoned, and assigned to the assignee of the instant invention. The specific part numbers recited above, then, may be operated as a 4 bit processor or as a 4 bit slice of a larger processor unit as will be hereinafter described.

A set of sixteen instructions, in a preferred embodiment, address the microprogram control device 14 and control the sequencing of the microprogram storage.

The main memory 10 may be, for purposes of this disclosure, of conventional design, the structure and function of which are well known to practitioners in the art. A timing device 12 is provided from which a system clock emanates timing signals to sequence the operations of the system. Such timnng functions are well known in the art.

The memory interface device 8 is an interface between the processor which includes the ALU 6 and register file 4 and the main memory 10 or peripheral devices 9 and handles data and address transfers between those devices. Hereafter when a reference is made to memory 10 such reference may also include peripheral devices. The interface device communicates with the ALU over the I Bus and O Bus, the input and output busses, respectively, of the ALU. Also connected between the ALU 6 and the memory interface unit 8 are pointer lines, the functions of which will be described later. Additionally, the interface connects to the timing device 12 and control memory 2 from the latter of which it receives control information based upon the contents of various fields of an executing microinstruction. Data and address busses provide the communication between the memory interface device 8 and the main memory.

In other embodiments, the flexibility of the register structure, data path control, and the use of internal arithmetic and logic capabilities allow the memory interface device to act as a controller, eliminating the need for the ALU 6 of FIG. 1, or as a control memory addressing device, eliminating the need for the microprogram control device 14. In a preferred embodiment of the system as a whole, however, as may be exemplified by the structure of FIG. 1, the capabilities of the interface device are used to improve data throughput of the system by relieving the ALU of certain address modification chores such as, but not limited to, subroutine handling, indexed or base register address computations, address formatting the like which will be later described. Further, the addition of an arithmetic and logic unit internally associated with the memory interface device allows certain mathematical operations to be performed on an extended precision basis by combining the operation of the ALU with the internal interface arithmetic and logic units.

Figure 2:
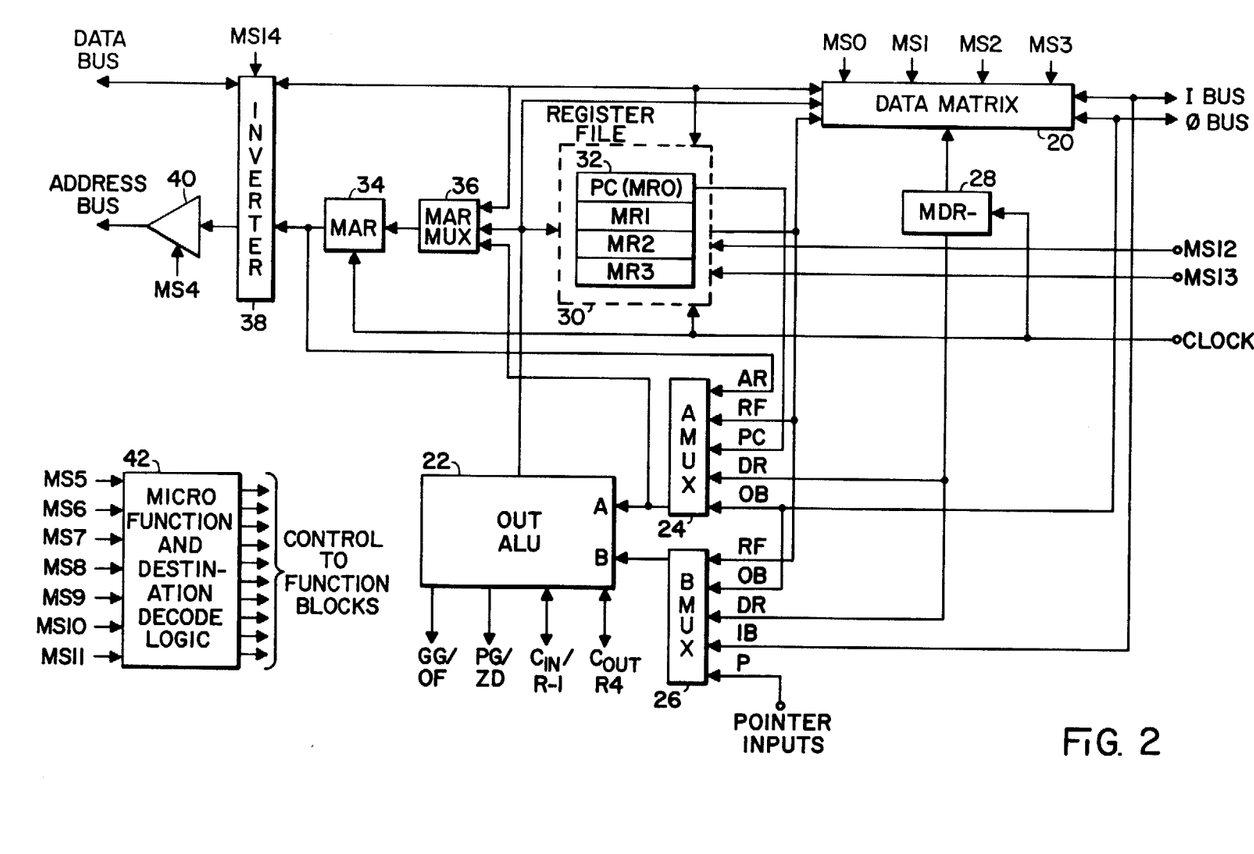
FIG. 2 is a block diagram of the memory interface device of the invention.

The memory interface device 8 of FIG. 1 is shown in functional block diagram form in FIG. 2. In a preferred embodiment the device may be 4 bits wide and may be connected in parallel with like devices to provide wider system I/O requirements. The processor input bus and output bus are shown in FIG. 2 connected to a data matrix device 20, which device controls seventeen different data transfer functions in the circuit. Select lines MS0 through MS3 set up the various transfer paths and enable the appropriate registers in the memory interface for each operation. The data interface functions are as follows:

F$\phi$B—Register File to $\phi$ Bus
R$\phi$B—Data Register to $\phi$ Bus
RDB—Register File to Data Bus
$\phi$DB—$\phi$ Bus to Data Bus
RDB—Data Register to Data Bus
ADR—ALU to Data Register
BDR—Data Bus to Data Register
AIB—ALU to I Bus
BIB—Data Bus to I Bus
IDR—I Bus to Data Register
$\phi$DR—$\phi$ Bus to Data Register
BRF—Data Bus to Register File
BAR—Data Bus to Address Register
MDR—Modify Data Register (I Bus to Data Register and Data Register to $\phi$ Bus)
PFB—Pipeline from Data Bus (Data Bus to Register File and Data Register to $\phi$ Bus)
PTB—Pipeline to Data Bus (I Bus to Data Register and Data Register to Data Bus)
NOP—No operation (all busses go to Vol Level)

Thus the system, through the data matrix 20 inputs on the input and output busses can communicate with any of the registers of the memory interface device and also with the arithmetic and logic unit 22 through a pair of multiplexors, an A multiplexor 24 and a B multiplexor 26. The data matrix 20 communicates directly with the memory data register 28 which provides a buffer storage for incoming or outgoing data. The memory data register 28 can communicate with either the A multiplexor 24 or the B multiplexor 26 of the ALU 22 over the lines labeled DR.

Likewise, the register file 30 which in a preferred embodiment is a 4 bit wide four word register file is used for storing information commonly used for memory addressing, such as the program counter, an index register, a stack pointer, and a page address storage. The register file can be expanded by connecting an external register file, not shown, to the I bus and O bus. The function of each of the registers of the register file is not fixed and optimum use thereof may be provided by the system designer. The top register 32 of the register file is labeled PC, representing program counter, and is given additional preferential treatment in that it has a direct input to the A multiplexor over line PC in addition to the general connections of the register file to both the A multiplexor and B multiplexor 24 and 26, respectively, over lines RF. The system input bus may communicate directly with the B multiplexor over the line IB and the pointer input, previously noted, can be seen to directly connect also to the B multiplexor 26. One additional input to the A multiplexor 24 is shown that being a connection from the memory address register 34 over the line designated AR. The memory address register 34 holds the memory address which has been transmitted or generated by the memory interface device for presentation to the main memory by means of the address bus. Associated with the memory address register 34 is a memory address register multiplexor 36 from which the address to be stored in the memory address register 34 may be provided from a number of sources including the ALU A multiplexor 24, the ALU 22 output, the register file 30 or the data matrix 20. Between the memory address register 34 and the address bus is an inverter 38, the function of which will be described later. Between the inverter 38 and the address bus is a gate 40 controllable by a control signal MS4, the operation of which will also be described later in conjunction with a description of a more detailed logic diagram of the memory interface device.

A fifth input/output data port is provided by way of a data bus shown connected to inverter 38 over which data is transmitted to or from the system memory.

In addition to transferring data to and from the ALU and memory, the memory interface device is capable of generating memory addresses. The microfunction and destination decode logic 42 combined with the ALU 22 provide the address generation capability. The memory interface device's ALU 22 is capable of seven basic operations with, as previously noted, a wide range of input sources and output destinations. The ALU 22 functions are as follows:

BINARY ADD
BINARY SUBTRACT
LOGIC OR
LOGIC AND
LOGIC EXCLUSIVE-OR
SHIFT LEFT
SHIFT RIGHT

Data sources and destinations for the ALU22 include the register file 30, the I Bus, data register 28, address register 34, O Bus, and the ALU pointer inputs. The pointer inputs can be used as a source of address modifiers or constants for memory addressing operations.

The ALU22 has all usual status and arithmetic outputs. By switching of control lines, the status/arithmetic outputs have dual functions. These functions will be described later.

Figure 3A:
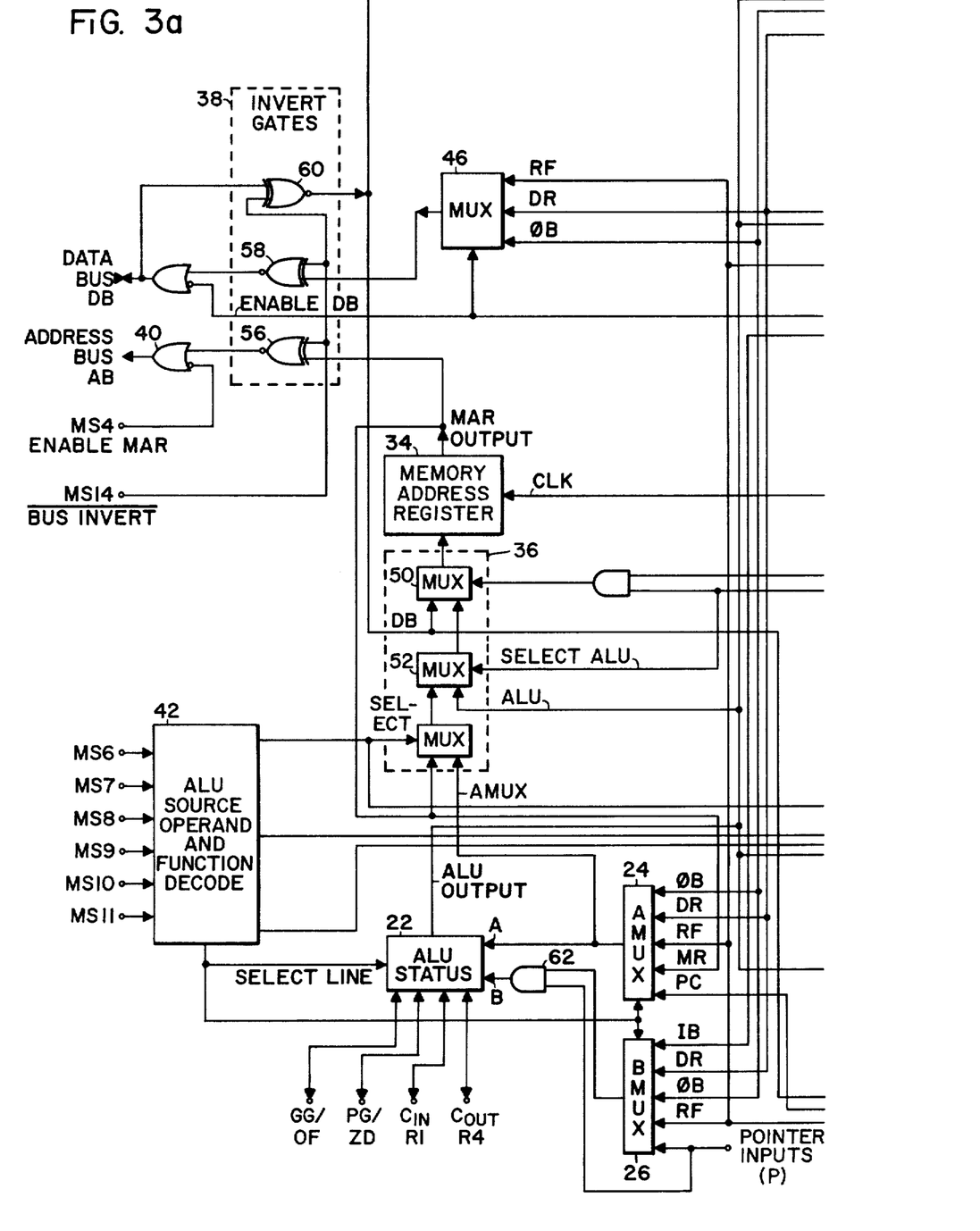
FIGS. 3a and 3b are more detailed logic diagrams of the device of FIG. 2.
Figure 3B:
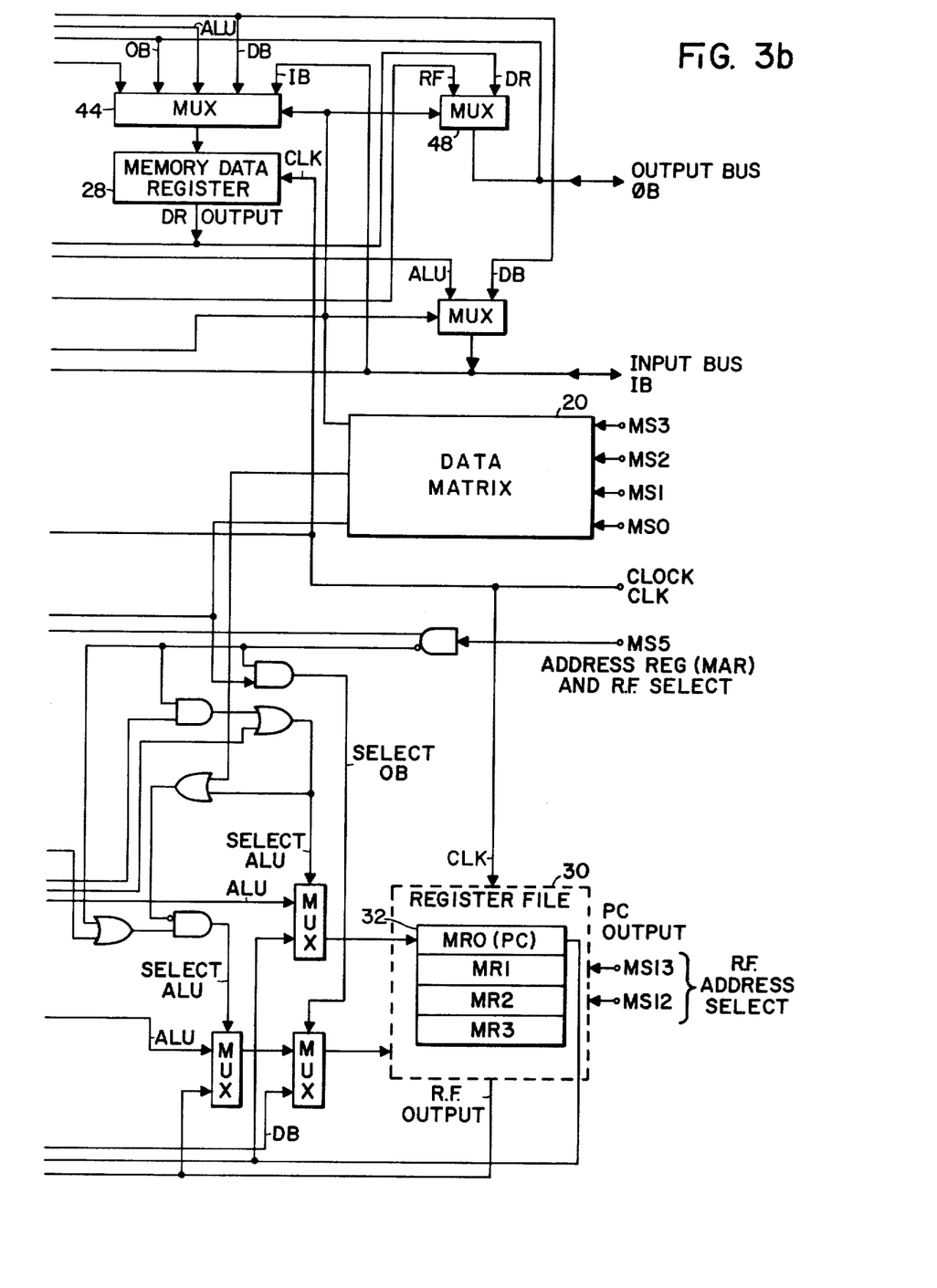

FIGS. 3a and 3b represent a more detailed logic diagram of the memory interface device of FIG. 2. Numbering of various of the elements in these Figures is consistent with that of FIG. 2. Accordingly, FIGS. 3a and 3b show six registers including memory data registers (MDR) 28, memory address register (MAR) 34, program counter (PC) 32 and three general registers shown as register file (RF) 30. The register file, again, does also include program counter 32, but the program counter is treated somewhat preferentially with respect to the other three registers of the register file and is, thus, separately designated. As previously noted, any of the three non-designated registers of register file 30 may be used as a stack pointer, an index register or other memory-related function registers.

Five 4 bit data ports, I-Bus, O-Bus, Data Bus, Address Bus and Pointer Inputs are shown. In this preferred embodiment, the memory interface device is 4 bits wide and, consequently, all busses and data paths within the device are 4 bits wide. Control lines may be one or more lines.

The arithmetic and logic unit 22 with its "A" multiplexor 24 and "B" multiplexor 26 are also shown. The ALU 22 performs arithmetic, logical, and shift functions on seven possible operands (MAR, PC, RF, MDR, I-Bus, $\phi$-Bus, and Pointers).

The data matrix 20, shown in FIG. 2 as a single block, is represented in FIGS. 3a and 3b as a block 20 having control input lines MS0, MS1, MS2, MS3 and a plurality of output lines directed to various gates to perform the data path selection operations briefly noted above which will be discussed in more detail later. Control line MS5, shown earlier as related to microfunction and destination decode logic 42 is used, actually, in conjunction with data matrix 20 selection to select the data bus destination.

Registers MR0 through MR3 make up the 4 word register file 30. Each register is 4 bits wide and expands to desired bit size with parallel circuits. All registers are constructed from master-slave flip-flops and store information on a positive going clock edge. A separate ALU multiplexor input is used for memory addressing with the program counter. The register file can be loaded from the Data Bus or the ALU outputs. Information in the register file can be routed to the $\phi$ Bus, Data Bus, ALU, or Address Register.

The Memory Data Register 28 is the primary storage element for information going to or from the processor on the Data Bus. This register can be loaded from the $\phi$ Bus, ALU, Data Bus, or I-Bus by means of multiplexor 44. Destinations for information in the Data Register are Data Bus through multiplexor 46, $\phi$-Bus through multiplexor 48, Address Register or ALU through the A MUX 24 or B MUX 26. In addition to holding memory data, the MDR can be used as an accumulator when the memory interface device operates as the main ALU or in parallel with the system ALU for double precision arithmetic.

The memory address register 34 holds the outgoing memory address information. Depending on the type of memory address, this register may be loaded from the Data Bus through multiplexor 50 which is a part of the generalized multiplexor 36 of FIG. 2, from the ALU 22 outputs through multiplexors 50, 52, from the $\phi$-Bus, the data register 28, register file 30 or program counter 32.

The ALU 22 performs seven basic functions: Add, subtract, AND, OR, Exclusive OR, Shift Left and Shift Right. These accomplish a variety of memory related tasks, including masking, bit manipulation, extended addressing, updating program counter, stack push or pop, and generating address offsets. Possible ALU operands are $\phi$ Bus, Register File, I Bus, Data Register, Address Register, Program Counter, or the Pointer (P) inputs. Selection of the ALU function and source operands is controlled by the Microfunction Decode logic 42 from select lines MS6 through MS11.

During arithmetic functions the $C_{IN}$/R-1 pin is the carry-in to the least significant ALU bit. During shift right, R-1 shifts out the least significant bit. Shift left is an arithmetic operation that is accomplished by adding a word to itself.

The $C_{OUT}$/R-4 is the carry-out for ALU arithmetic functions. During shift operations it couples the most significant shift bit. The $C_{OUT}$/R-4 pin contains the most significant bit for sign testing during ALU logic operations. The MSB is also brought out on arithmetic shift right because the sign bit is repeated.

The PG/ZD pin serves as group propagate for fast ALU arithmetic operations and as zero detect for logic and some arithmetic functions. The selection between propagate and zero detect is controlled by the ALU function select line M36-MS9.

The GG/OF pin contains group generate for all ALU arithmetic operations. In addition, the pin can be selected to display 2's complement overflow for selected arithmetic and shift left operations. A conflict between overflow and group generate is avoided by programming only the most significant slice for overflow.

The Data Bus and Address Bus are 4 bit ports. The Data Bus with bidirectional information transfer is for interfacing to memory or peripheral data ports. Transfer of data on this port is controlled by the Data Matrix Select lines. When not used as outputs, the data bus drivers are held at a negative logic "1". The Data Bus port is then available as an input.

The Address Bus is a 4 bit port designed to output information held in the memory address register. It is used for memory and peripheral addressing, but can also be used to output ALU calculations stored in the MAR. The Address Bus is driven from an output gate 40 which also performs a buffering function controlled by MS4. This select line (when logic "0") forces the address outputs to a negative logic "1", and frees the port for other system functions and addresses.

An inverter 38 controlled by MS14 is placed in series with the Data Bus and the Address Bus. In the invert mode (MS14="0"), incoming or outgoing memory data and outgoing address information is inverted by applying an input to exclusive OR gates 56, 58 and 60. Otherwise, true data is transferred through the circuit. The invert feature allows a direct interface with any combination of positive or negative logic formats between the processor and I/O busses. Since, in a preferred embodiment, the memory interface device is constructed in negative MECL logic, all data internally is carried in negative format, i.e., low voltage ($V_{OL}$)=logic 1, high voltage ($V_{OH}$)=logic 0. To interface directly with non-negative logic devices, such as memories, the invert select feature inverts the negative MECL data to the more conventional positive logic of many memory or peripheral systems.

The P inputs are four input pins routed directly to the ALU 22 through a MUX 26, or through gate 62 during masking. They provide a source for pointers, address modifiers, or constants as needed for memory addressing. These inputs also allow for push/pop stack operations and modifying the program counter. When used as a main ALU, the P inputs are available for other system functions such as a register file port.

The I Bus and φ Bus are bidirectional data ports designed to interface between the Memory Interface Device and other parts of the processor (Register File, ALU, Microprogram Control etc., as shown in FIG. 1). Transfer of information to and from the I Bus and φ Bus is controlled by the Data Matrix select lines MS0 through MS3.

Select lines MS6 through MS11 are decoded to determine the ALU operands and the ALU function, while MS5 with data matrix controls the destination for the ALU output. The ALU function select logic 42 works in parallel with the Data Matrix 20. This allows simultaneous data and address operations within the device for maximum system throughput. Programming information on the ALU function and Destination Decoding select lines is given in following Functional Description tables.

A single clock input is common to all registers in the device. Each register is built from master-slave flip-flops and loads information on the positive going ($V_{OL}$ to $V_{OH}$) clock edge. Signals on the register inputs can change at any time with the clock input at either logic state and not change the register outputs. Information is held constant in any register not selected to receive a data transfer.

FUNCTIONAL DESCRIPTION

Fifteen select lines, MS0 through MS14, control the flow of information inside the memory interface device. The following describes the programming of these inputs to perform the various circuit functions. All of the truth tables related thereto are set forth in Tables 1–9 attached hereto at the end of the specification are expressed in negative logic with VOL being a logic 1 and VOH a logic 0.

Data Transfer Control—MS0,MS1,MS2,MS3,MS5,MS14

Table 1 lists the 17 device data transfer functions. In addition to selecting between the BRF and BAR transfers, MS5 is used to select the memory address register data source as described later. MS14 inverts information going to and from the Data Bus. Inverting the Data Bus also inverts information between the memory address register and Address Bus.

Address Output Enable MS4

MS4 controls the Address Bus output drivers. The disable feature can be used for DMA operation, multiprocessors on a common memory, and other memory bus transfers. Table 2 (Appendix) shows the programming of MS4.

Register File Address Select-MS12 and MS13

MS12 and MS13 are used to select one of the four register file words for all register file (RF) load or read operations. The program counter (PC) operations are a special case that automatically pick MR0 and do not require MS12 or MS13. This does not inhibit selecting MR0 for any RF function. Table 3 (Appendix) gives the truth table for register file selection.

ALU Control-MS6 Through MS11

MS6 through MS11 control the ALU operand and function selection. MS6, MS7, and MS8 select the ALU 22 function. MS9 with MS6, MS7 and MS8 select the ALU function and control the ALU status outputs. MS10 and MS11 control the ALU operand selection. Table 4 (Appendix) shows programming for the various ALU functions and selection of the ALU operands.

ALU Destination Control-MS5

The ALU output can be routed to several points in the device. ALU 22 to I Bus and ALU to Data Register 29 transfers are controlled by the Data Matrix 20, Table 1. Other operations load the ALU output into the Memory Address Register 34, Register File 30, or Program Counter 32. These transfers are determined by the selected Data Matrix transfer, MS5, and the selected ALU function. Table 5 (Appendix) shows programming combinations for routing information to the MAR, RF, and PC. Commands that transfer the selected ALU A MUX 24 operand to the address register are designated by the letter A under the AR column.

ALU FUNCTIONS

The following section defines the various ALU functions and describes use of the device for memory addressing. Programming and choice of operands may be found in Table 4.

Add-(OP A) Plus (OP B)·P Plus $C_{IN}$=Result
Sub-(OP A) Plus (OP B)·P Plus $C_{IN}$=Result Add and subtract perform the logic AND using the B operand and P inputs. This is used for bit masking prior to an arithmetic operation. Look-ahead carry is possible when MS9 is equal to logic 1 on the less significant devices in a slice system. The most significant slice can have MS9 equal to logic 0 to provide 2's complement overflow.

ASL,LSL—Shift Left One Bit

The selected operand is shifted left by adding the input to itself. For an arithmetic shift left, MS9 equal logic 0, overflow is generated from a change in the sign bit. As with add and subtract look-ahead carry minimizes propagation delay.

A MUX INPUT TO ALU

ALU OUTPUT RESULT

ASR,LSR—Shift Right One Bit

Shift right uses the carry pins for shift coupling. MS 9 is held at logic 0 for arithmetic shifting. This holds the sign bit constant and displays the sign on $C_{out}$ of the most significant slice.

STATUS AND SHIFT I/O LOGIC FUNCTION

Table 6 defines the logic equations for the status and shift conditions for each of the 16 ALU functions. The A and B inputs are selected as shown in Table 4. Table 7 defines the symbols used in the various tables.

Figure 4:
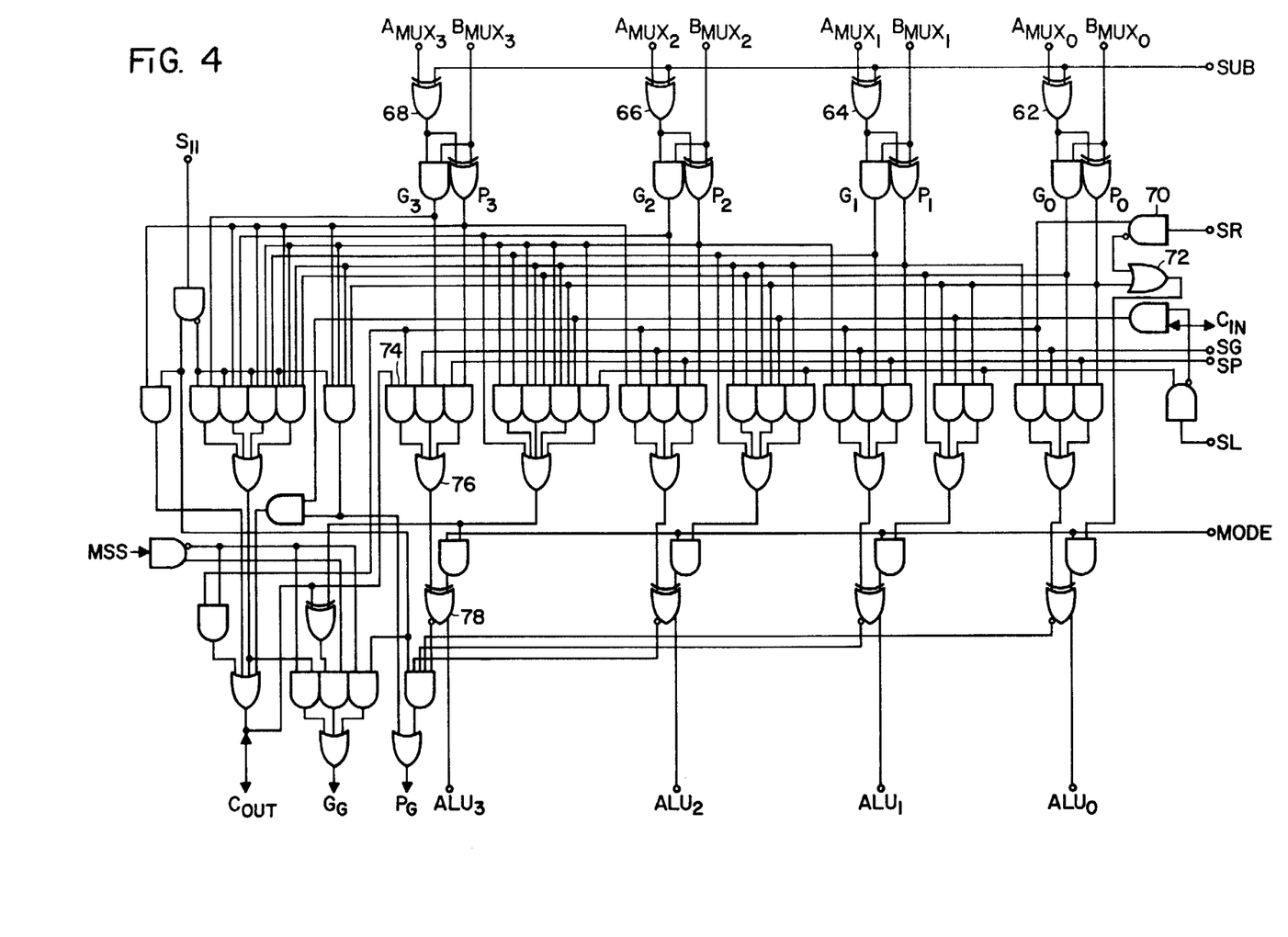
FIG. 4 is a detailed logic block diagram of the arithmetic and logic unit of the interface device of the invention.

FIG. 4 is a logic block diagram of an arithmetic and logic unit 22' shown at the top of the Figure are the Modify Program Counter-PC Plus (OP B)·P Plus $C_{in}=$-Result Modify Pointer-(OP A) Plus P plus $C_{in}=$Result Modify Address Register-AR Plus (OP B)·P Plus $C_{in}=$-Result These three functions are normally used with unsigned or positive numbers, and overflow is not generated. Modify Program Counter provides a means for doing a program jump from a variety of sources. The Modify Address Register gives the same jump in program capability without changing the program counter. The Modify functions are especially helpful for stack operations. The stack can directly address memory while it is simultaneously updated in the ALU. Alternately, stack information can be updated, routed to the memory address register, and stored in the register file using the same clock cycle. The modify pointer format will take the P inputs and increment or decrement the program counter without disturbing other registers in the device.

AND-(OP A) AND (OP B) AND P=Result
OR-(OP A) OR (OP B) AND P=Result
E$\phi$R-(OP A)EXCLUSIVE OR (OP P) AND P=Result
BIT MASK-(OP A) AND P=Result
BIT TOGGLE-(OP A)EXCLUSIVE OR P=Result Group propagate performs zero detect and $C_{out}$ shows the MSB for all logic functions. AND, OR, and EXOR are general purpose logic functions, allowing the device to perform compare and bit manipulation for controller applications. The Bit Mask, in addition to forcing zero bits, can be used to obtain the zero detect and sign bit status after an arithmetic function. This is accomplished when all P inputs are a logic "1". The Bit Toggle can be used with error detection and correction circuits to correct incoming data from memory or peripherals. Other applications include encoding or decoding for secure communications or special data formats.

inputs $A_{MUX0}$-$A_{MUX3}$ and $B_{MUX0}$-$B_{MUX3}$ representing inputs to the ALU from the A and B multiplexors, 24 and 26, respectively. Connected between each A multiplexor bit line and the ALU input logic are exclusive OR inverter gates 62, 64, 66, 68. The second input to each of the XOR gates is a subtract control line for inverting the $A_{MUX}$ output for subtraction. The ALU bit outputs, $ALU_0$-$ALU_3$ are shown at the bottom of FIG. 4.

As previously noted, the $C_{IN}$ and $C_{OUT}$ lines to/from the ALU are bidirectional and perform dual functions. Each performs the usual carry (carry-in and carry-out) functions which receive carries from less significant slices and carry out to more significant slices. Additionally, the pins are used to carry-in or carry-out a bit in the arithmetic shift right (ASR) and logical shift right (LSR) functions. The shift right control is connected to an AND gate 70, which when high enables OR gate 72 to allow a bit on the $B_{MUX0}$ input line to be taken out on the $C_{IN}$ pin, to the next less significant slice ALU. Likewise, a bit propagated by the next most significant slice is applied to the $C_{OUT}$ pin and is allowed, by gates 74, 76, 78 to appear at the $ALU_3$ output. The SR control also allows the $B_{MUX1}$ input to be shifted to the $ALU_0$ output, the $B_{MUX2}$ input to the $ALU_1$ output and the $B_{MUX3}$ input to the $ALU_2$ output.

The remainder of the logic of the ALU 22 will not be described in detail, but Table 8 shows the logic equations for all ALU controls, from which the operation of the ALU logic may be discerned. The look-ahead, status and shift output logic equations are described in Table 9 (Appendix).

Consequently, while in accordance with the Patent Statutes, there has been described what at present are considered to be the preferred forms of the invention it will be obvious to those skilled in the art that numerous changes and modifications may be made herein without departing from the true spirit and scope of the invention and it is, therefore, aimed in the following claims to cover all such modifications.

TABLE 1

DATA TRANSFER CONTROL

| MS 3 | MS 2 | MS 1 | MS 0 | MS 5 | MS 14 | MNEMONIC | OPERATION SOURCE | DESTINATION | BUS OUTPUTS DB | IB | OB | NEXT STATE DR |
|---|---|---|---|---|---|---|---|---|---|---|---|---|
| 0 | 0 | 0 | 0 | X | X | N$\phi$P | NO OPERATION | | 1 | 1 | 1 | — |
| 0 | 0 | 0 | 1 | X | X | AIB | ALU | IB | 1 | ALU | 1 | — |
| 0 | 0 | 1 | 0 | X | X | $\phi$DR | $\phi$B | DR | 1 | 1 | 1 | $\phi$B |
| 0 | 0 | 1 | 1 | X | X | ADR | ALU | DR | 1 | 1 | 1 | ALU |
| 0 | 1 | 0 | 0 | 0 | 0 | BRF* | $\overline{DB}$ | RF | 1 | 1 | 1 | — |
| | | | | 0 | 1 | | DB | RF | 1 | 1 | 1 | — |
| | | | | 1 | 0 | BAR* | $\overline{DB}$ | AR | 1 | 1 | 1 | — |

TABLE 1-continued
DATA TRANSFER CONTROL

| MS 3 | MS 2 | MS 1 | MS 0 | MS 5 | MS 14 | MNE-MONIC | OPERATION SOURCE | OPERATION DESTINATION | BUS OUTPUTS DB | BUS OUTPUTS IB | BUS OUTPUTS OB | NEXT STATE DR |
|---|---|---|---|---|---|---|---|---|---|---|---|---|
|   |   |   |   | 1 | 1 |      | DB  | AR  | 1  | 1   | 1  | — |
| 0 | 1 | 0 | 1 | X | 0 | BIB  | $\overline{DB}$ | IB | 1 | $\overline{DB}$ | 1 | — |
|   |   |   |   | X | 1 |      | DB  | IB  | 1  | DB  | 1  | — |
| 0 | 1 | 1 | 0 | X | 0 | BDR  | $\overline{DB}$ | DR | 1 | 1 | 1 | $\overline{DB}$ |
|   |   |   |   | X | 1 |      | DB  | DR  | 1  | 1   | 1  | DB |
| 0 | 1 | 1 | 1 | X | X | IDR  | IB  | DR  | 1  | 1   | 1  | IB |
| 1 | 0 | 0 | 0 | X | 0 | FDB  | $\overline{RF}$ | DB | $\overline{RF}$ | 1 | 1 | — |
|   |   |   |   | X | 1 |      | RF  | DB  | RF | 1   | 1  | — |
| 1 | 0 | 0 | 1 | X | 0 | RDB  | $\overline{DR}$ | DB | $\overline{DR}$ | 1 | 1 | — |
|   |   |   |   | X | 1 |      | DR  | DB  | DR | 1   | 1  | — |
| 1 | 0 | 1 | 0 | X | 0 | φDB  | $\overline{\phi B}$ | DB | $\overline{\phi B}$ | 1 | 1 | — |
|   |   |   |   | X | 1 |      | φB  | DB  | φB | 1   | 1  | — |
| 1 | 0 | 1 | 1 | X | 0 | PIB  | IB  | DR  |    |     |    |   |
|   |   |   |   |   |   |      |     |     | $\overline{DR}$ | 1 | 1 | IB |
|   |   |   |   |   |   |      | $\overline{DR}$ | DB |   |     |    |   |
|   |   |   |   | X | 1 |      | IB  | DR  |    |     |    |   |
|   |   |   |   |   |   |      |     |     | DR | 1   | 1  | IB |
|   |   |   |   |   |   |      | DR  | DB  |    |     |    |   |
| 1 | 1 | 0 | 0 | X | X | FφB  | RF  | φB  | 1  | 1   | RF | — |
| 1 | 1 | 0 | 1 | X | X | RφB  | DR  | φB  | 1  | 1   | DR | — |
| 1 | 1 | 1 | 0 | X | 0 | PBφ  | $\overline{DB}$ | DR |   |     |    |   |
|   |   |   |   |   |   |      |     |     | 1  | 1   | DR | $\overline{DB}$ |
|   |   |   |   |   |   |      | DR  | φB  |    |     |    |   |
|   |   |   |   | X | 1 |      | DB  | DR  |    |     |    |   |
|   |   |   |   |   |   |      |     |     | 1  | 1   | DR | DB |
|   |   |   |   |   |   |      | DR  | φB  |    |     |    |   |
| 1 | 1 | 1 | 1 | X | X | PIφ  | IB  | DR  |    |     |    |   |
|   |   |   |   |   |   |      |     |     | 1  | 1   | DR | IB |
|   |   |   |   |   |   |      | DR  | φB  |    |     |    |   |

*These instructions override the ALU destination (see Table 5)
X = Don't care
— = No Change in Register State

TABLE 2
ADDRESS BUS CONTROL

| MS 4 | MS 14 | ADDRESS BUS |
|---|---|---|
| 0 | — | Logic 1 |
| 1 | 0 | $\overline{MAR}$ |
| 1 | 1 | MAR |

TABLE 3
REGISTER FILE SELECTION

| MS 13 | MS 12 | REGISTER |
|---|---|---|
| 0 | 0 | MR0 (PC) |
| 0 | 1 | MR1 |
| 1 | 0 | MR2 |
| 1 | 1 | MR3 |

TABLE 4
ALU PROGRAMMING*

|       | MS 6 | MS 7 | MS 8 | MS 6 | MS 7 | MS 8 | MS 6 | MS 7 | MS 8 | MS 6 | MS 7 | MS 8 |
|-------|---|---|---|---|---|---|---|---|---|---|---|---|
|       | 0 | 0 | 0 | 0 | 0 | 1 | 0 | 1 | 0 | 0 | 1 | 1 |
| MS 9 10 11 | SUB $G_G = V\ P_G = Z_D$ | | | ADD $G_G = V\ P_G = Z_D$ | | | ASL $G_G = V\ P_G = Z_D$ | | | POINTER $G_G = G\ P_G = P$ | | |
| 0 0 0 | φB Minus IB . P | | | φB Plus IB . P | | | φB | | | φB Plus P | | |
| 0 0 1 | φB Minus DR . P | | | φB Plus DR . P | | | DR | | | DR Plus P | | |
| 0 1 0 | RF Minus φB . P | | | RF Plus φB . P | | | RF | | | RF Plus P | | |
| 0 1 1 | RF Minus DR . P | | | RF Plus DR . P | | | AR | | | PC Plus P | | |
|       |   |   |   |   |   |   |   | LSL |   |   | RELATIVE |   |
|       | $G_G = G\ P_G = P$ | | | $G_G = G\ P_G = P$ | | | $G_G = G\ P_G = P$ | | | $G_G = G\ P_G = P$ | | |
| 1 0 0 | φB Minus IB . P | | | φB Plus IB . P | | | φB | | | PC Plus IB . P | | |
| 1 0 1 | φB Minus DR . P | | | φB Plus DR . P | | | DR | | | PC Plus DR . P | | |
| 1 1 0 | RF Minus φB . P | | | RF Plus φB . P | | | RF | | | PC Plus φB . P | | |
| 1 1 1 | RF Minus DR . P | | | RF Plus DR . P | | | AR | | | PC Plus RF . P | | |
|       | MS 6 | MS 7 | MS 8 | MS 6 | MS 7 | MS 8 | MS 6 | MS 7 | MS 8 | MS 6 | MS 7 | MS 8 |
|       | 1 | 0 | 0 | 1 | 0 | 1 | 1 | 1 | 0 | 1 | 1 | 1 |
|       | MS AND | | | φR | | | ASR $C_{out} = R3\ P_G = Z_D$ | | | EφR | | |

TABLE 4-continued

ALU PROGRAMMING*

| 9 | 10 | 11 | $C_{out} = R3\ P_G = Z_D$ | $C_{out} = R3\ P_G = Z_D$ | $G_G = 1$ | $C_{out} = R3\ P_G = Z_D$ |
|---|----|----|---|---|---|---|
| 0 | 0 | 0 | φB . (IB . P) | φB + (IB . P) | φB | φB . ⊕(IB . P) |
| 0 | 0 | 1 | φB . (DR . P) | φB + (DR . P) | DR | φB ⊕ (DR . P) |
| 0 | 1 | 0 | RF . (φB . P) | RF + (φB . P) | RF | RF ⊕ (DB . P) |
| 0 | 1 | 1 | RF . (DR . P) | RF + (DR . P) | AR | RF ⊕ (DR . P) |
|   |   |   |   | EφRP | LSR | MODIFY |
|   |   |   | $C_{out} = R3\ P_G = Z_D$ | $C_{out} = R3\ P_G = Z_D$ | $G_G = 1\ P_G = Z_D$ | $G_G = G\ P_G = P$ |
| 1 | 0 | 0 | φB . P | φB ⊕ P | φB | AR Plus P |
| 1 | 0 | 1 | DR . P | DR ⊕ P | DR | AR Plus DR . P |
| 1 | 1 | 0 | RF . P | RF ⊕ P | RF | AR Plus φB . P |
| 1 | 1 | 1 | AR . P | AR ⊕ P | AR | AR Plus RF . P |

*NOTE:
1. "A MUX" Operand is Left Entry, and "B MUX" Operand is Right Entry.
2. Single Operand Instructions use "A MUX".
3. R3 = Sign Detect

TABLE 5

DESTINATION PROGRAMMING

| ALU OPERATION | 6 | 7 | MS 8 | 9 | 10 | 11 | DATA INTERFACE OPERATION (SEE TABLE 1) | MS 5 | DESTINATION AR | RF | PC |
|---|---|---|---|---|---|---|---|---|---|---|---|
|   |   |   |   |   |   |   | BRF | 0 | A | DB | — |
|   |   |   |   |   |   |   | BAR | 1 | DB | ALU | — |
| φB PLUS P | 0 | 1 | 1 | 0 | 0 | 0 |   |   |   |   |   |
| DR PLUS P | 0 | 1 | 1 | 0 | 0 | 1 | ADR or AIB | 0 | A | — | — |
|   |   |   |   |   |   |   |   | 1 | ALU | — | — |
| RF PLUS P | 0 | 1 | 1 | 0 | 1 | 0 |   |   |   |   |   |
|   |   |   |   |   |   |   | ALL OTHERS | 0 | A | ALU | — |
|   |   |   |   |   |   |   |   | 1 | ALU | ALU | — |
|   |   |   |   |   |   |   | BRF | 0 | PC | DB | ALU* |
|   |   |   |   |   |   |   | BAR | 1 | DB | — | ALU |
| PC PLUS P | 0 | 1 | 1 | 0 | 1 | 1 |   |   |   |   |   |
|   |   |   |   |   |   |   |   | 0 | PC | — | ALU |
|   |   |   |   |   |   |   | ALL OTHERS | 1 | ALU | — | ALU |
| (RELATIVE) |   |   |   |   |   |   | BRF | 0 | — | DB | ALU* |
| PC PLUS IB . P | 0 | 1 | 1 | 1 | 0 | 0 | BAR | 1 | DB | — | — |
| PC PLUS DR . P | 0 | 1 | 1 | 1 | 0 | 1 |   |   |   |   |   |
|   |   |   |   |   |   |   |   | 0 | — | — | ALU |
|   |   |   |   |   |   |   | ADR OR AIB | 1 | ALU | — | — |
| PC PLUS φB . P | 0 | 1 | 1 | 1 | 1 | 0 |   |   |   |   |   |
| PC PLUS RF . P | 0 | 1 | 1 | 1 | 1 | 1 |   |   |   |   |   |
|   |   |   |   |   |   |   |   | 0 | — | — | ALU |
|   |   |   |   |   |   |   | ALL OTHERS | 1 | ALU | — | — |
| SUB | 0 | 0 | 0 | — | — | — | BRF | 0 | — | DB | — |
| ADD | 0 | 0 | 1 | — | — | — | BAR | 1 | DB | — | — |
| ALL ASL/LSL | 0 | 1 | 0 | — | — | — |   |   |   |   |   |
| OTHERS AND | 1 | 0 | 0 | — | — | — |   | 0 | — | — | — |
|   |   |   |   |   |   |   | ADR OR AIB |   |   |   |   |
| φR/EφRP | 1 | 0 | 1 | — | — | — |   | 1 | ALU | — | — |
| ASR/LSR | 1 | 1 | 0 | — | — | — |   |   |   |   |   |
| EφR/MOD | 1 | 1 | 1 | — | — | — |   | 0 | — | ALU | — |
|   |   |   |   |   |   |   | ALL OTHERS | 1 | ALU | — | — |

*If the PC is selected (S12 = 0, S13 = 0) during the indicated operation, then DB+ALU→PC
— = No change in register state.
NOTE:
If MS 14 = 0, replace DB with $\overline{DB}$ in Table 5.

TABLE 6

ALU OUTPUT, STATUS & SHIFT I/O

| 6 | 7 | 8 | 9 | ALU FUNCTION | ALU OUTPUT $R_3\ R_2\ R_1\ R_0$ | GG/OF | PG/ZD | STATUS OF SHIFT I/O $C_{OUT}/R_4$ | $C_{IN}/R_{-1}$ |
|---|---|---|---|---|---|---|---|---|---|
| 0 | 0 | 0 | 0 | SUBTRACT | $A + \bar{B} + C_{IN}$ | OF | ZD | $C_{OUT}$(OUTPUT) | $C_{IN}$ (INPUT) |
|   |   |   | 1 | (SEE NOTE 1) |   | GG | PG |   |   |
| 0 | 0 | 1 | 0 | ADD | $A + B + C_{IN}$ | OF | ZD | $C_{OUT}$(OUTPUT) | $C_{IN}$ (INPUT) |
|   |   |   | 1 |   |   | GG | PG |   |   |
|   |   |   | 0 | ASL |   | $A_3 \oplus A_2$ | ZD |   |   |

TABLE 6-continued

| | | | | ALU | ALU OUTPUT, STATUS & SHIFT I/O | | | |
|---|---|---|---|---|---|---|---|---|
| | | | | | ALU OUTPUT | STATUS OF SHIFT I/O | | |
| 6 | 7 | 8 | 9 | FUNCTION | $R_3 R_2 R_1 R_0$ | GG/OF | PG/ZD | $C_{OUT}/R_4$ | $C_{IN}/R_{-1}$ |
| 0 | 1 | 0 | | | $A + A + C_{IN}$ | | | $C_{OUT}$(OUTPUT) | $C_{IN}$ (INPUT) |
| | | | 1 | LSL | | GG | PG | | |
| 0 | 1 | 1 | 0 | POINTER | $A + P + C_{IN}$ | GG | PG | | |
| | | | | | | | | $C_{OUT}$(OUTPUT) | $C_{IN}$ (INPUT) |
| | | | 1 | RELATIVE | $A + B + C_{IN}$ | GG | PG | | |
| | | | 0 | | $A \cdot B$ | $A_3 \cdot \bar{B}_3$ | ZD | | |
| 1 | 0 | 0 | | AND | | | | $R_3$ (OUTPUT) | $C_{IN}$ (INPUT) |
| | | | 1 | | $A \cdot P$ | $A_3$ | ZD | | |
| | | | 0 | OR | $A + B$ | 0 | ZD | | |
| 1 | 0 | 1 | | | | | | $R_3$ (OUTPUT) | $C_{IN}$ (INPUT) |
| | | | 1 | E$\phi$RP | $A \oplus P$ | GG | ZD | | |
| | | | 0 | ASR | $A_3 A_3 A_2 A_1$ | 1 | ZD | $R_3$ (OUTPUT) | |
| 1 | 1 | 0 | | | | | | | $A_O$ (OUTPUT) |
| | | | 1 | LSR | $R_4 A_3 A_2 A_1$ | 1 | ZD | $R_4$ (INPUT) | |
| | | | 0 | E$\phi$R | $A \oplus B$ | GG | ZD | $R_3$ (OUTPUT) | |
| 1 | 1 | 1 | | | | | | | $C_{IN}$ (INPUT) |
| | | | 1 | MODIFY | $AR + B + C_{IN}$ | GG | ZD | $C_{OUT}$(OUTPUT) | |

NOTE 1:
$\bar{B}_i$ is inserted for $B_i$ in the equations below when the SUBTRACT mode is selected.
DEFINITIONS:
$PG = (A_3 + B_3) \cdot (A_2 + B_2) \cdot (A_1 + B_1) \cdot (A_0 + B_0)$
$GG = (A_3 \cdot B_3) + (A_3 + B_3) \cdot (A_2 \cdot B_2) + (A_3 + B_3) \cdot (A_2 + B_2) \cdot (A_1 \cdot B_1) + (A_3 + B_3) \cdot (A_2 + B_2) \cdot (A_1 + B_1) \cdot (A_0 B_0)$
$C_3 = (A_2 \cdot B_2) + (A_2 + B_2) \cdot (A_1 \cdot B_1) + (A_2 + B_2) \cdot (A_1 + B_1) \cdot (A_0 \cdot B_0) + (A_2 + B_2) \cdot (A_1 + B_1) \cdot (A_0 + B_0) \cdot C_{IN}$ $ZD = \overline{R3} \cdot \overline{R2} \cdot \overline{R1} \cdot \overline{R0}$
$C_{OUT} = GG + PG \cdot C_{IN}$   Where $R_i$ = ALU Output, Bit i; i = (LSB)0,1,2,3(MSB)
$OF = C_3 \oplus C_{OUT}$   $A_i$ = A Operand, Bit i; i = (LSB)0,1,2,3(MSB)
   $B_i$ = B Operand, Bit i; i = (LSB)0,1,2,3(MSB)
$= C_3 \cdot (\overline{A_3} \cdot \overline{B_3}) + C_3 \cdot (A_3 B_3)$   P = Pointer Inputs

TABLE 7

DEFINITIONS OF SYMBOLS USED IN THE VARIOUS TABLES

| SYMBOL | MEANING |
|---|---|
| AR | Data Output of the MAR Register |
| DR | Data Output of the MDR Register |
| RF | Data Output of one of the Register File Registers as Selected by MS12 and MS13 |
| PC | Data Output of the MR0 Register Located in the Register File PC Data Output is not Dependent on the MS12 or MS13 Select Lines |
| ALU or R | Data Output of the ALU |
| A | A MUX Output is the A Operand to the ALU (See Table 4 for the Selection of the A & B Operands) |

TABLE 7-continued

DEFINITIONS OF SYMBOLS USED IN THE VARIOUS TABLES

| SYMBOL | MEANING |
|---|---|
| P | Pointer Inputs to ALU |
| AB | Address Bus |
| $\phi$B | Bidirection $\phi$ Bus Port |
| IB | Bidirectional I Bus Port |
| DB | Bidirectional Data Bus |
| Plus | 2's Complement Addition |
| Minus | 2's Complement Subtraction |
| . | Logical AND |
| + | Logical OR |
| $\oplus$ | Logical Exclusive OR |

TABLE 8

ALU $SCL = (\bar{S}_{11} \cdot \bar{S}_{10} \cdot S_9 \cdot S_8) \cdot \bar{S}_7 \cdot S_6 + S_{11} \cdot S_{10} \cdot \bar{S}_7 \cdot \bar{S}_6 + S_{11} \cdot S_{10} \cdot S_9 \cdot \bar{S}_7 \cdot \bar{S}_6$
$SFL = S_{11} \cdot S_{10} \cdot S_8 \cdot S_7 \cdot S_6 + S_{11} \cdot S_{10} \cdot S_9 \cdot S_7 \cdot S_6 + S_{11} \cdot S_8 \cdot S_7 \cdot S_6$
$S\phi L = S_{11} \cdot S_{10} \cdot S_8 \cdot S_7 \cdot S_6 + S_{11} \cdot S_{10} \cdot S_9 \cdot S_7 \cdot S_6 + S_{11} \cdot S_8 \cdot S_7 \cdot S_6$
$SDL = S_{10} \cdot S_7 \cdot S_6 + S_{11} \cdot S_{10} \cdot S_8 \cdot S_7 \cdot S_6 + S_{11} \cdot S_{10} \cdot S_9 \cdot S_7 \cdot S_6 + S_{11} \cdot S_{10} \cdot S_9 \cdot \bar{S}_7 \cdot \bar{S}_6$
$SAL = S_{10} \cdot S_7 \cdot S_6 + S_{11} \cdot S_{10} \cdot S_8 \cdot S_7 \cdot S_6 + S_{11} \cdot S_{10} \cdot S_9 \cdot S_7 \cdot S_6$ $SIL = \overline{(S_{11} \cdot S_{10} \cdot S_9 \cdot S_8)} \cdot \bar{S}_7 \cdot S_6$
$DIP = S_{11} \cdot S_{10} \cdot S_9$ $SCR = \bar{S}_{11} \cdot \bar{S}_{10} \cdot \bar{S}_9 \cdot S_8 \cdot \overline{(S_7 \cdot S_6)}$
$SFR = S_{10} \cdot S_8 \cdot S_{11} \cdot S_{10} \cdot S_9 \cdot S_8$
$S\phi R = S_{10} \cdot S_8 + S_{11} \cdot S_{10} \cdot S_9 \cdot S_8$
$SUB = S_{11} \cdot S_{10} \cdot S_9$
$SP = \bar{S}_{11} + S_9$
$SG = S_{11} \cdot S_{10}$
$SR = S_{11} \cdot S_{10} \cdot S_9 \cdot S_8$
$SL = S_{11} \cdot S_{10} \cdot S_9 \cdot S_8$
$M\phi DE = \bar{S}_{11} + S_{11} \cdot S_{10} \cdot S_9 \cdot \bar{S}_8$

TABLE 9

LOOK AHEAD STATUS AND SHIFT OUTPUTS

MSS Designates Most Significant Slice $C_{OUT} = \bar{S}_{11} \cdot (G_3 + G_2 \cdot P_3 + G_1 \cdot P_2 \cdot P_3 + G_0 \cdot P_1 \cdot P_2 \cdot P_3 + C_{IN} \cdot P_0 \cdot P_1 \cdot P_2 \cdot P_3 + S_{14} \cdot SR + (SG \cdot G_3 + SP \cdot P_3 + S_{10} \cdot P_3) S_{11}$

TABLE 9-continued
LOOK AHEAD STATUS AND SHIFT OUTPUTS
MSS Designates Most Significant Slice $C_{IN} = \overline{SR} + P_0$ $G_G = S_{14} \cdot (G_3 + G_2 \cdot P_3 + G_1 \cdot P_2 \cdot P_3 + G_0 \cdot P_1 \cdot P_2 \cdot P_3) + S_{11} \cdot S_{14} +$
$\quad\quad \text{MODE} \cdot S_{14} (C_{OUT} \oplus (G_2 + G_1 \cdot P_2 + G_0 \cdot P_1 \cdot P_2 + C_{IN} \cdot P_0 \cdot P_1 \cdot P_2 \cdot \overline{SL} + P_2 \cdot SL))$ $P_G = \bar{S}_{11} \cdot P_0 \cdot P_1 \cdot P_2 \cdot P_3 + S_{11} \cdot \overline{ALU_3} \cdot \overline{ALU_2} \cdot \overline{ALU} \cdot \overline{ALU_0}$ $ALU_0 = (P_0 \cdot SP + G_0] SG + P_1 \cdot SR) \oplus C_{IN} \cdot \text{MODE}$ $ALU_1 = (P_1 \cdot SP + G_1 \cdot SG + P_2 \cdot SR) \oplus (\text{Mode}(C_{IN} \cdot \overline{SL} \cdot P_0 + G_0 + SL \cdot P_0))$ $ALU_2 = (\text{MODE} \cdot (C_{IN} \cdot \overline{SL} \cdot P_0 \cdot P_1 + G_0 \cdot P_1 + G_1 + SL \cdot P_1))) \oplus (P_2 \cdot SP + G_2 \cdot SG + P_3 \cdot SR)$ $ALU_3 = (\text{MODE} \cdot (C_{IN} \cdot \overline{SL} \cdot P_0 \cdot P_1 \cdot P_2 + G_0 \cdot P_1 \cdot P_2 + G_1 \cdot P_2 + G_2 + SL \cdot P_2)$
$\quad\quad \oplus (P_3 \cdot SP + G_3 \cdot SG + C_{OUT} \cdot SR)$

What is claimed is:

1. In a system having a central processor including an arithmetic logic unit (ALU), and a memory unit (MU), a memory interface device between said central processor and said memory unit comprising:
   (a) means coupling said central processor and said memory interface device for transmitting memory address information between said central processor and said memory interface device,
   (b) means coupling said memory interface device and said memory unit for transmitting memory address information between said memory interface device and said memory unit;
   (c) arithmetic and logic means within said memory interface device for arithmetically or logically operating on said address information, in response to control signals from other system elements, to generate an address to be transmitted to said memory unit;
   (d) a register file within said memory interface device, said register file including a plurality of registers;
   (e) means coupled to said arithmetic and logic means and to said register file for alternatively, selectively, providing an address to be transmitted to said memory unit from either a register within said register file, or a generated address from said arithmetic and logic means;
   (f) means coupled to said means for providing an address for transmitting a selected one of the provided addresses from said memory interface device to said memory unit, and
   (g) means for transmitting data between said memory interface device and said memory unit for storage or retrieval of such data in said memory unit at a location defined by the address transmitted thereto from said memory interface device.

2. A memory interface device as set forth in claim 1 further comprising at least one further register, said further register being selectively coupled to said memory interface device arithmetic and logic means for storing an output of said arithmetic and logic means.

3. A memory interface device as set forth in claim 1 further comprising a memory data register, said memory data register selectively coupled to receive said data from said means for transmitting data and for providing data to said means for transmitting data.

4. A memory interface device as set forth in claim 3 wherein said memory data register is further selectively coupled to said memory interface device arithmetic and logic means for providing data to said memory interface device arithmetic and logic means.

* * * * *